US012671791B1

(12) United States Patent
Han et al.

(10) Patent No.: US 12,671,791 B1
(45) Date of Patent: Jun. 30, 2026

(54) CHAT CHANNEL MANAGEMENT FOR A VIRTUAL CONFERENCE SERVICE

(71) Applicant: Zoom Video Communications, Inc., San Jose, CA (US)

(72) Inventors: Lin Han, Los Altos, CA (US); Wenlong Li, Suzhou (CN); Jingwei Li, Suzhou (CN); Yike Liu, Santa Clara, CA (US); Ying Lu, Cerritos, CA (US); Ang Qiao, Suzhou (CN); Yitao Wang, Suzhou (CN); Shuang Wang, Suzhou (CN); Fengtian Zhang, Suzhou (CN)

(73) Assignee: Zoom Communications, Inc., San Jose, CA (US)

( * ) Notice: Subject to any disclaimer, the term of this patent is extended or adjusted under 35 U.S.C. 154(b) by 208 days.

(21) Appl. No.: 18/425,355

(22) Filed: Jan. 29, 2024

(51) Int. Cl.
H04N 7/15 (2006.01)
H04L 51/046 (2022.01)

(52) U.S. Cl.
CPC ........... H04N 7/157 (2013.01); H04L 51/046 (2013.01); H04N 7/152 (2013.01)

(58) Field of Classification Search
CPC ....... H04N 7/157; H04N 7/152; H04L 51/046
See application file for complete search history.

(56) References Cited

U.S. PATENT DOCUMENTS

| | | | |
|---|---|---|---|
| 11,863,335 B1* | 1/2024 | Clark | H04L 12/1822 |
| 2016/0063277 A1* | 3/2016 | Vu | G06F 21/57 |
| | | | 726/4 |
| 2018/0302357 A1* | 10/2018 | Cohen | H04L 51/212 |
| 2021/0029249 A1* | 1/2021 | Erhart | H04M 3/5175 |
| 2021/0243142 A1* | 8/2021 | Treat | H04L 51/04 |
| 2023/0023160 A1* | 1/2023 | Schemers | H04L 51/214 |
| 2023/0030976 A1* | 2/2023 | Kalinichenko | H04L 65/403 |
| 2025/0005467 A1* | 1/2025 | Stephens | G06Q 10/063112 |

* cited by examiner

*Primary Examiner* — Stella L. Woo
(74) *Attorney, Agent, or Firm* — Kilpatrick Townsend & Stockton LLP

(57) ABSTRACT

Techniques may include accessing a message in a database of the virtual conference service. In addition, the techniques may include identifying one or more features of the message. The techniques may include for each chat channel: identifying one or more features of a particular chat channel; and classifying the message as belonging to one or more chat channels of a first user account based on the features of the message and the features of the particular chat channel. Moreover, the techniques may include assigning a channel score to each of the chat channels based on the classification. Also, the techniques may include determining an order for the chat channels, where the order is determined based on the channel score for each of the chat channels. Further, the techniques may include presenting the one or more chat channels in the order.

20 Claims, 9 Drawing Sheets

810 ~ ACCESS A MESSAGES IN A DATABASE OF A VIRTUAL CONFERENCE SERVICE

820 ~ IDENTIFY ONE OR MORE FEATURES OF THE MESSAGE

830 ~ IDENTIFY ONE OR MORE FEATURES OF A PARTICULAR CHAT CHANNEL

840 ~ DETERMINE WHETHER TO CLASSIFY THE MESSAGE AS BELONGING TO THE PARTICULAR CHAT CHANNEL BASED ON THE ONE OR MORE FEATURES OF THE MESSAGE AND THE ONE OR MORE FEATURES OF THE PARTICULAR CHAT CHANNEL

850 ~ ASSIGN A CHANNEL SCORE TO EACH OF A PLURALITY OF CHAT CHANNELS BASED ON THE CLASSIFICATION

860 ~ DETERMINE AN ORDER FOR THE PLURALITY OF CHAT CHANNELS

870 ~ PRESENT THE PLURALITY OF CHAT CHANNELS IN THE DETERMINED ORDER

800

600

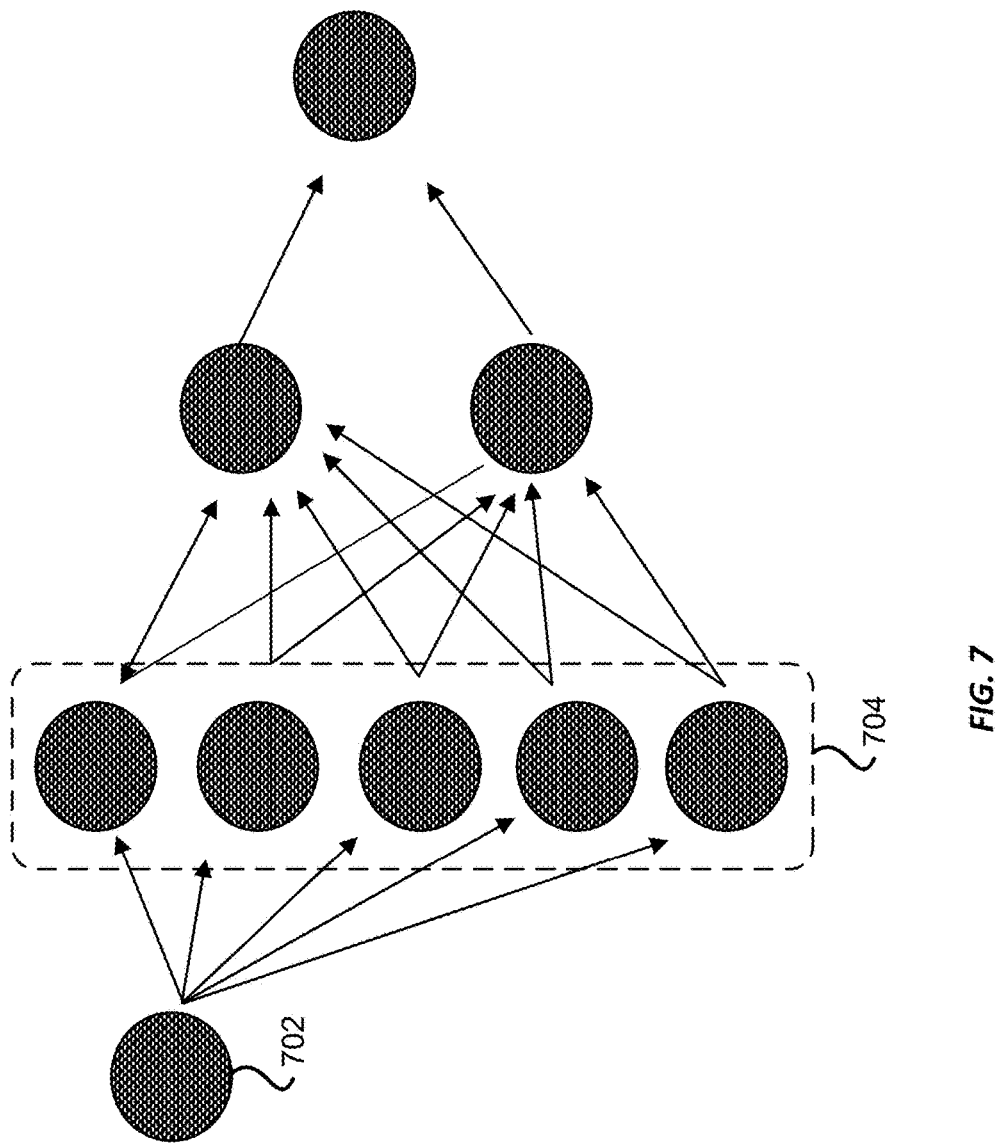
FIG. 7

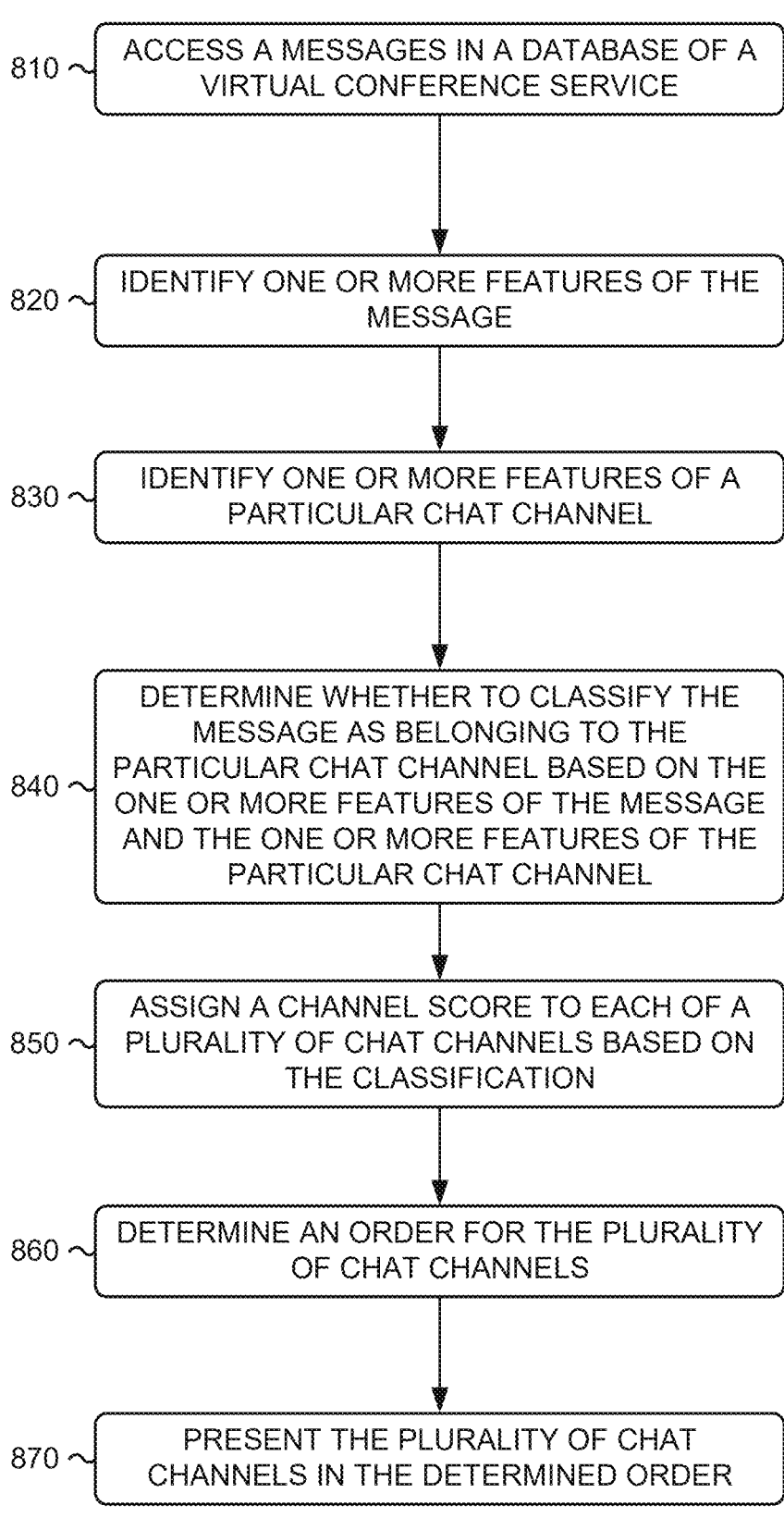

810 ~ ACCESS A MESSAGES IN A DATABASE OF A VIRTUAL CONFERENCE SERVICE

820 ~ IDENTIFY ONE OR MORE FEATURES OF THE MESSAGE

830 ~ IDENTIFY ONE OR MORE FEATURES OF A PARTICULAR CHAT CHANNEL

840 ~ DETERMINE WHETHER TO CLASSIFY THE MESSAGE AS BELONGING TO THE PARTICULAR CHAT CHANNEL BASED ON THE ONE OR MORE FEATURES OF THE MESSAGE AND THE ONE OR MORE FEATURES OF THE PARTICULAR CHAT CHANNEL

850 ~ ASSIGN A CHANNEL SCORE TO EACH OF A PLURALITY OF CHAT CHANNELS BASED ON THE CLASSIFICATION

860 ~ DETERMINE AN ORDER FOR THE PLURALITY OF CHAT CHANNELS

870 ~ PRESENT THE PLURALITY OF CHAT CHANNELS IN THE DETERMINED ORDER

CHAT CHANNEL MANAGEMENT FOR A VIRTUAL CONFERENCE SERVICE

FIELD

This disclosure generally relates to virtual conferencing, and more specifically relates to chat channel management for a virtual conference service.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

FIG. 7 shows an example machine learning (ML) model for message management for a virtual conference provider;

FIG. 8 shows an example method for message management for a virtual conference provider.

DETAILED DESCRIPTION

Figure 1:
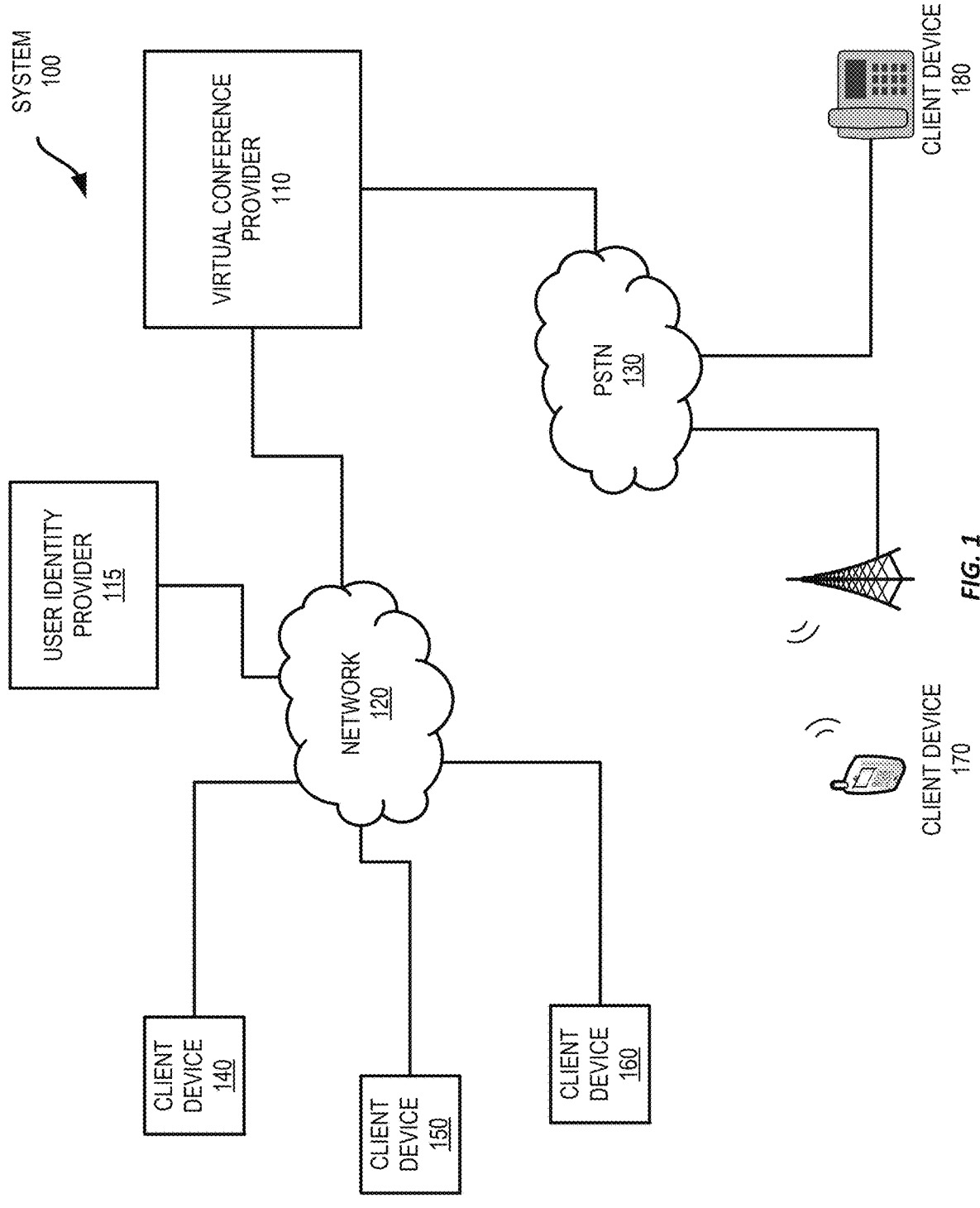
FIGS. 1-4 show example systems for message management for a virtual conference provider.

Examples are described herein in the context of chat channel management for a virtual conference provider. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Before, during, or after a virtual conference, participants may engage with each other to discuss any matters of interest. This engagement can include chat messages that are exchanged between the participants before, during, and after a virtual conference. These messages can be exchanged through a chat service of the virtual conference service. A chat message can include a payload comprising a text-based message and other content such as images, files, emojis, animated images, videos, and the like. Chat messages can be part of a conversation (e.g., chat channel) between two participants, however, any number of participants can participate (e.g., send, receive, and view messages) in a single chat channel.

Virtual conference participants may receive an overwhelming number of chat messages on a daily basis. Virtual conference providers are increasingly used for collaboration in work and educational environments, and this collaboration can involve discussions in chat channels. In addition, virtual conference providers may be used for personal reasons, such as viewing a nieces' dance recital or catching up with friends both in virtual conferences and in chat channels. These diverse use cases, and the general proliferation of virtual conferencing, can mean that a virtual conference participant may receive tens of thousands of messages from thousands of users in hundreds of chat channels.

The volume of chat messages can make it difficult or impossible for a participant to manage their chat channels. The volume of messages can mean that a participant cannot read, sort, and prioritize (e.g., manage) chat messages in a short timeframe. To properly manage messages, a participant may need an uninterrupted block of time to read, sort, and prioritize messages. However, the participant's work schedule may not allow them to have uninterrupted time to manage messages, and, even if time is available, uninterrupted blocks of time may need to be spent on higher priority tasks (e.g., coding software, drafting documents, etc.). Instead, workers often respond to chat messages between scheduled meetings, however, the regular cadence of new chat messages throughout the day can mean that the participant is unable to make progress in managing their messages.

In addition, a participant may not be able to locate appropriate messages within the large volume of received messages. Locating appropriate chat messages for a particular topic can be time consuming because the messages may be scattered across unrelated chat channels in discussions with disparate groups of participants. For example, preliminary discussions of a particular issue can occur through a direct chat channel between two participants, the issue may then be talked about at a department wide chat channel, and then a team, with a dedicated team chat channel, can be assigned to resolve the issue. The chat messages in each of these channels may be relevant to solving the issue, but locating each appropriate message can be challenging. This challenge is amplified if the messages are discussed across different channels. An issue may be discussed, and a solution developed, over a long period of time, and relevant chat messages may be lost among the unrelated messages. Also, a relevant message may be missed and unread by the participants, and the participants are unlikely to locate a message without knowing it exits.

Chat messages and chat channels (e.g., chat threads, threads, etc.) can be managed by a chat management system that is part of the virtual conference provider's chat system. The chat management system can rank chat channels so that the most relevant chat channels are highlighted for the user. This identification can include, for example, changing the order of the chat channels in a graphical user interface so that the chat channels are shown in a descending order of relevance. The relevance can be determined by a trained machine learning model or by performing a series of rules on the chat channels and chat messages.

A chat channel's relevance can be personalized for a particular participant. For example, a new message in a particular thread may be highly relevant to a participant who regularly posts in the thread, but the same message may not be very relevant to a participant who is passively subscribed to the chat channel (e.g., subscribed but rarely posts). In addition, the actionability of a chat message (e.g., whether a response or other action is required) may impact the message's relevance. For example, a message that requires a response may be more urgent, and therefore more relevant, than a message that does not require any action. Also, the timestamp for a message may be used to determine relevance, because more recent messages (e.g., with a more recent timestamp) may be more relevant than earlier messages because those messages convey more recent information.

Participants can also create dedicated chat channels for particular keywords or participants (e.g., user accounts). These channels can be an aggregation of chat messages from other chat channels. For example, a chat channel for a particular user can combine chat messages sent to or from a particular user account or chat conversations (e.g., a series of related chat messages) that involve the particular user. In another example, a chat channel can be created for a particular topic (e.g., "2024 Fall Sales Conference") and the chat channel can contain chat messages or chat conversations where the topic is mentioned.

As discussed above, managing chat messages within a virtual conference provider system can be challenging for users. Locating an appropriate chat message can require the user to navigate different graphical user interfaces, within the provider's chat system, to locate appropriate messages. Reading each new message can require selecting a separate graphical user interface view in order to read the message and evaluate the message's relevance. Once relevant messages are located, the user may have to provide input to the graphical user interfaces to edit and reorder the chat channels so that relevant chat messages are presented to the user in a descending order of relevance. The ordering of messages by relevance may be performed in response to a user request (e.g., an input to a graphical user interface). The present disclosure represents a technical benefit by improving the functionality of the virtual conference provider's graphical user interface. For example, by presenting relevant messages related to a topic without the user having to perform a search, by reducing the amount of input that a user provides to the graphical user interfaces, and by reducing the number of graphical user interface views that the virtual conference provider system renders.

This illustrative example is given to introduce the reader to the general subject matter discussed herein and the disclosure is not limited to this example. The following sections describe various additional non-limiting examples and examples of providing edited virtual conference recordings.

Referring now to FIG. 1, FIG. 1 shows an example system 100 that provides virtual conferencing functionality to various client devices. This virtual conferencing functionality can include the exchange of audio and video streams during a virtual conference, and the exchange of chat messages before, during, and after a virtual conference. The system 100 includes a virtual conference provider 110 that is connected to multiple communication networks 120, 130, through which various client devices 140-180 can participate in virtual conferences hosted by the virtual conference provider 110. For example, the virtual conference provider 110 can be located within a private network to provide virtual conferencing services to devices within the private network, or it can be connected to a public network, e.g., the internet, so it may be accessed by anyone. Some examples may even provide a hybrid model in which a virtual conference provider 110 may supply components to enable a private organization to host private internal virtual conferences or to connect its system to the virtual conference provider 110 over a public network.

The system optionally also includes one or more user identity providers, e.g., user identity provider 115, which can provide user identity services to users of the client devices 140-160 and may authenticate user identities of one or more users to the virtual conference provider 110. In this example, the user identity provider 115 is operated by a different entity than the virtual conference provider 110, though in some examples, they may be the same entity. In some instances, virtual conference provider 110 may provide a user profile language to virtual conference provider 210.

Figure 2:
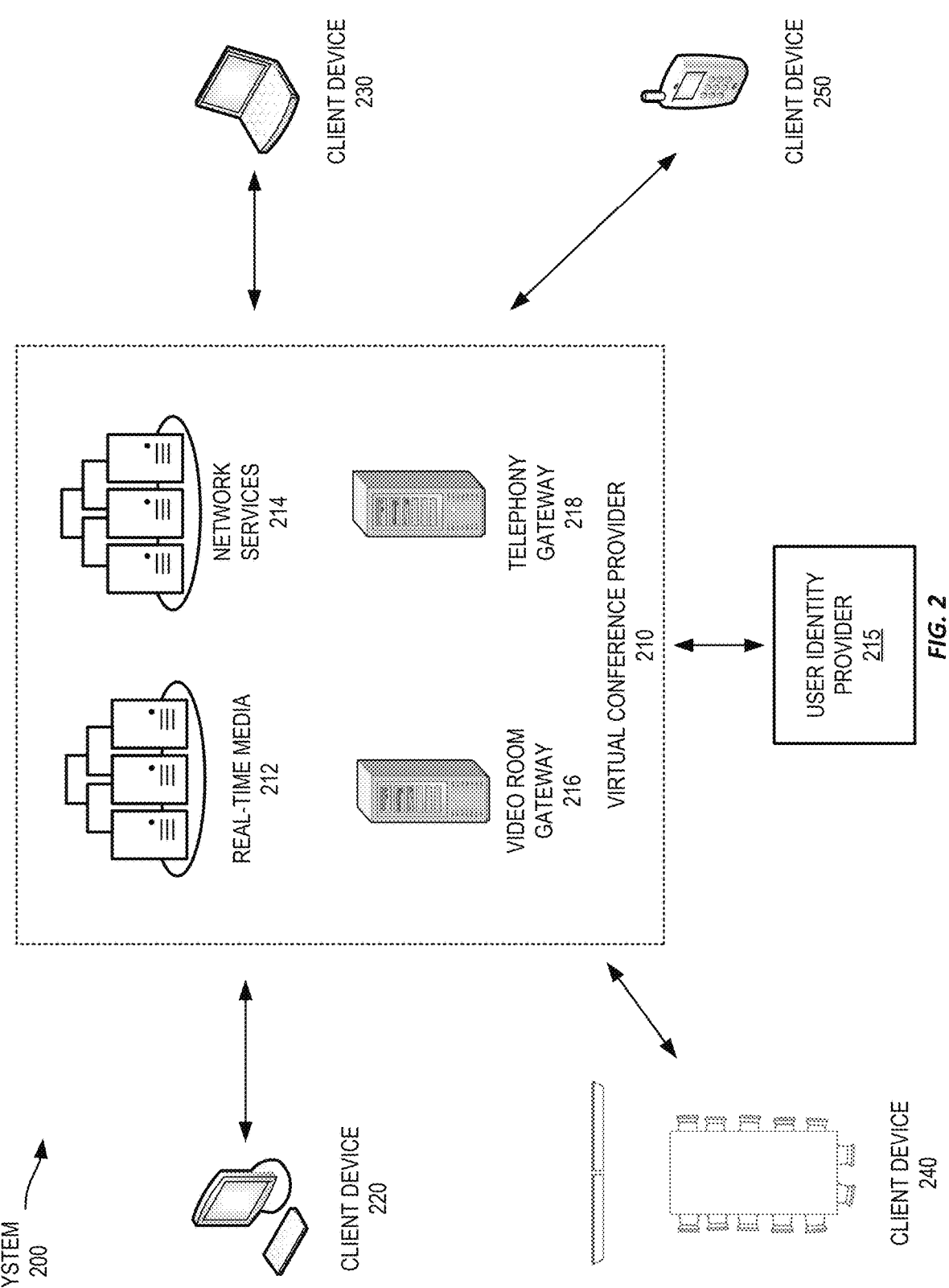

Virtual conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging (e.g., chat messaging) before, during, or after the meetings, create and manage breakout rooms from the main meeting, etc. FIG. 2, described below, provides a more detailed description of the architecture and functionality of the virtual conference provider 110.

Meetings in this example virtual conference provider 110 are provided in virtual "rooms" to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference (e.g., virtual conference) may be used. Further, in some examples, and as alluded to above, a meeting may also have "breakout" rooms. Such breakout rooms may also be rooms that are associated with a "main" videoconference room. Thus, participants in the main videoconference room may exit the room into a breakout room, e.g., to discuss a particular topic, before returning to the main room. The breakout rooms in this example are discrete meetings that are associated with the meeting in the main room. However, to join a breakout room, a participant must first enter the main room. A room may have any number of associated breakout rooms according to various examples.

To create a meeting with the virtual conference provider 110, a user may contact the virtual conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the virtual conference provider 110 may prompt the user for certain information, such as a date, time, and duration for the meeting, a number of participants, a type of encryption to use, whether the meeting is confidential or open to the public, a meeting language, etc. After receiving the various meeting settings, the virtual conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The virtual conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started or the host may be required to specifically admit one or more of the users.

During the meeting, the participants may employ their client devices 140-180 to capture audio or video information and stream that information to the virtual conference provider 110. They also receive audio or video information from the virtual conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The virtual conference provider 110 may also invalidate the meeting information, such as the meeting identifier or password/passcode.

To provide such functionality, one or more client devices 140-180 may communicate with the virtual conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the virtual conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio, video, and messaging capabilities and may enable one or more users to participate in a virtual conference meeting hosted by the virtual conference provider 110.

Client devices 140-180 can be used to send chat messages to the virtual conference provider 110 and to view messages within the provider's system. These chat messages can be sent and viewed through a webpage accessed by a client device 140-160 or client application executed by a client device 140-160. In some cases, the chat messages can be sent by a telephony device using a text messaging protocol/ service such as the short messaging service (SMS). The client devices 140-170 may need to be authenticated before chat messages can be sent or viewed.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the virtual conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and is not limited solely to dedicated telephony devices like conventional telephones.

Referring again to client devices 140-160, these devices 140-160 contact the virtual conference provider 110 using network 120 and may provide information to the virtual conference provider 110 to access functionality provided by the virtual conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the virtual conference provider 110.

A user identity provider 115 may be any entity trusted by the virtual conference provider 110 that can help identify a user to the virtual conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 110 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the virtual conference provider 110.

When the user accesses the virtual conference provider 110 using a client device, the virtual conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the virtual conference provider 110 either provides or denies access to its services, respectively. The user identify provider 115 may provide a user profile language to the virtual conference provider 110.

For telephony devices, e.g., client devices 170-180, the user may place a telephone call to the virtual conference provider 110 to access virtual conference services. After the call is answered, the user may provide information regarding a virtual conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the virtual conference provider 110. For example, telephony devices may be unable to provide user identification information to identify the telephony device or the user to the virtual conference provider 110. Thus, the virtual conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the virtual conference provider 110, even in cases where the user has an authenticated identity and employs a client device capable of identifying the user to the virtual conference provider 110. The virtual conference provider 110 may determine whether to allow such anonymous users to use services provided by the virtual conference provider 110. Anonymous users, regardless of the reason for anonymity, may be restricted as discussed above with respect to users employing telephony devices, and in some cases may be prevented from accessing certain meetings or other services, or may be entirely prevented from accessing the virtual conference provider 110. In some embodiments, a device may need to be authenticated in order to send chat messages to the virtual conference provider system or to view chat messages sent within the system.

Referring again to virtual conference provider 110, in some examples, it may allow client devices 140-160 to encrypt their respective video and audio streams, and chat messages, to help improve privacy in their meetings. Encryption may be provided between the client devices 140-160 and the virtual conference provider 110 or it may be provided in an end-to-end configuration where media streams, and chat messages, transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the virtual conference provider 110, while allowing the virtual conference provider 110 to access the decrypted media streams to perform certain processing, such as recording the meeting for the participants or generating transcripts of the meeting for the participants. End-to-end encryption may be used to keep the meeting entirely private to the participants without any worry about a virtual conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt media content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt media streams. Thus, while encrypting the media streams may be desirable in many instances, it is not required as it may prevent some users from participating in a meeting.

By using the example system shown in FIG. 1, users can create and participate in meetings using their respective client devices 140-180 via the virtual conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a virtual conference provider 210 provides virtual conferencing functionality to various client devices 220-250. The client devices 220-250 include two conventional computing devices 220-230, dedicated equipment for a virtual conference room 240, and a telephony device 250. Each client device 220-250 communicates with the virtual conference provider 210 over a communications network, such as the internet for client devices 220-240 or the PSTN for client device 250, generally as described above with respect to FIG. 1. The virtual conference provider 210 is also in communication with one or more user identity providers 215, which can authenticate various users to the virtual conference provider 210 generally as described above with respect to FIG. 1.

In this example, the virtual conference provider 210 employs multiple different servers (or groups of servers) to provide different aspects of virtual conference functionality, thereby enabling the various client devices to create and participate in virtual conference meetings. The virtual conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more virtual conference meetings to the client devices 220-250. Each of these servers 212-218 can use the one or more communication networks to facilitate the exchange of chat messages between the client devices 220-250.

The real-time media servers 212 provide multiplexed media streams to meeting participants, such as the client devices 220-250 shown in FIG. 2. While video and audio streams typically originate at the respective client devices, they are transmitted from the client devices 220-250 to the virtual conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing. In some instances, the media stream may contain metadata indicating a language for the media stream or the client devices 220-250. The language may be a device language provided by software on the client device or a language selected by a user of the client device via a graphical user interface (GUI).

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed streams to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O) as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives media streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service. Chat messages originating from each client device 220-250 can be presented to each client device including the device that generated the message. The messages from each client device 220-250 can be presented to a client device in a graphical user interface of client software executing on the client device or a webpage accessed by the client device. The graphical user interface may label each message with an account or device that generated the message and a time stamp corresponding to a time when the message was generated. Client devices 220-250 do not need to be participating in a virtual conference in order to exchange chat messages, and chat messages can be exchanged by client devices, or user accounts, that have never attended the same conference and are not scheduled to attend the same virtual conference. In some situations, a participant can attend a virtual conference using a first client device and simultaneously access chat messages through a second client device. The virtual conference provider 210 can organize the chat messages into channels and these channels can be provided to one or more of the client devices 220-250.

In addition to multiplexing media streams, the real-time media servers 212 may also decrypt incoming media stream in some examples. As discussed above, media streams may be encrypted between the client devices 220-250 and the virtual conference system 210. In some such examples, the real-time media servers 212 may decrypt incoming media streams, multiplex the media streams appropriately for the various clients, and encrypt the multiplexed streams for transmission.

In some examples, to provide multiplexed streams, the virtual conference provider 210 may receive media streams from the various participants and publish those streams to the various participants to subscribe to and receive. Thus, the virtual conference provider 210 notifies a client device, e.g., client device 220, about various media streams available from the other client devices 230-250, and the client device 220 can select which media stream(s) to subscribe to and receive. In some examples, the virtual conference provider

210 may provide to each client device the available streams from the other client devices, but from the respective client device itself, though in other examples it may provide all available streams to all available client devices. Using such a multiplexing technique, the virtual conference provider 210 may enable multiple different streams of varying quality, thereby allowing client devices to change streams in real-time as needed, e.g., based on network bandwidth, latency, etc.

As mentioned above with respect to FIG. 1, the virtual conference provider 210 may provide certain functionality with respect to unencrypted media streams at a user's request. For example, the meeting host may be able to request that the meeting be recorded or that a transcript of the audio streams be prepared, which may then be performed by the real-time media servers 212 using the decrypted media streams, or the recording or transcription functionality may be off-loaded to a dedicated server (or servers), e.g., cloud recording servers, for recording the audio and video streams. In some examples, the virtual conference provider 210 may allow a meeting participant to notify it of inappropriate behavior or content in a meeting. Such a notification may trigger the real-time media servers to 212 record a portion of the meeting for review by the virtual conference provider 210. Still other functionality may be implemented to take actions based on the decrypted media streams at the virtual conference provider, such as monitoring video or audio quality, adjusting or changing media encoding mechanisms, etc.

It should be appreciated that multiple real-time media servers 212 may be involved in communicating data for a single meeting and media streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the virtual conference provider 210 via local servers 212 to send and receive media streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing media streams, and chat messages, may be distributed throughout the virtual conference system 210 and across many different real-time media servers 212.

Turning to the network services servers 214, these servers 214 provide administrative functionality to enable client devices to create or participate in meetings, send meeting invitations, create or manage chat channels, create or manage user accounts or subscriptions, and other related functionality. Further, these servers may be configured to perform different functionalities or to operate at different levels of a hierarchy, e.g., for specific regions or localities, to manage portions of the virtual conference provider under a supervisory set of servers. When a client device 220-250 accesses the virtual conference provider 210, it will typically communicate with one or more network services servers 214 to access their account or to participate in a meeting.

When a client device 220-250 first contacts the virtual conference provider 210 in this example, it is routed to a network services server 214. The client device may then provide access credentials for a user, e.g., a username and password or single sign-on credentials, to gain authenticated access to the virtual conference provider 210. This process may involve the network services servers 214 contacting a user identity provider 215 to verify the provided credentials. Once the user's credentials have been accepted, the client device 220-250 may perform administrative functionality, like updating user account information, if the user has an identity with the virtual conference provider 210, or scheduling a new meeting, by interacting with the network services servers 214.

In some examples, users may access the virtual conference provider 210 anonymously. When communicating anonymously, a client device 220-250 may communicate with one or more network services servers 214 but only provide information to create or join a meeting, depending on what features the virtual conference provider allows for anonymous users. For example, an anonymous user may access the virtual conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, a meeting language, a source language or a target language for translation, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving media streams. In some instances, the real-time media servers 212 may store a source language, target language, user profile language, meeting language, or identified language for the media streams sent and received by the server.

Once the host has started the meeting, subsequent users requesting access will be admitted to the meeting if the meeting record is located and the passcode matches the passcode supplied by the requesting client device 220-250.

In some examples additional access controls may be used as well. But if the network services server(s) 214 determines to admit the requesting client device 220-250 to the meeting, the network services server 214 identifies a real-time media server 212 to handle media streams, and chat messages, to and from the requesting client device 220-250 and provides information to the client device 220-250 to connect to the identified real-time media server 212. In some embodiments, the separate servers may be used to handle media streams and chat messages. Additional client devices 220-250 may be added to the meeting as they request access through the network services server(s) 214.

After joining a meeting, client devices will send and receive media streams, and chat messages, via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the virtual conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the virtual conference provider

210. For example, the video conferencing hardware may be provided by the virtual conference provider to one or more of its subscribers, which may provide access credentials to the video conferencing hardware to use to connect to the virtual conference provider 210.

The video room gateway servers 216 provide specialized authentication and communication with the dedicated video conferencing hardware that may not be available to other client devices 220-230, 250. For example, the video conferencing hardware may register with the virtual conference provider 210 when it is first installed and the video room gateway servers 216 may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the virtual conference provider 210.

Referring now to the telephony gateway servers 218, these servers 218 enable and facilitate telephony devices' participation in meetings hosed by the virtual conference provider 210. Because telephony devices communicate using the PSTN and not using computer networking protocols, such as TCP/IP, the telephony gateway servers 218 act as an interface that converts between the PSTN and the networking system used by the virtual conference provider 210.

For example, if a user uses a telephony device to connect to a meeting, they may dial a phone number corresponding to one of the virtual conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the virtual conference provider 210 discussed above are merely examples of such devices and an example architecture. Some virtual conference providers may provide more or less functionality than described above and may not separate functionality into different types of servers as discussed above. Instead, any suitable servers and network architectures may be used according to different examples.

Figure 3:
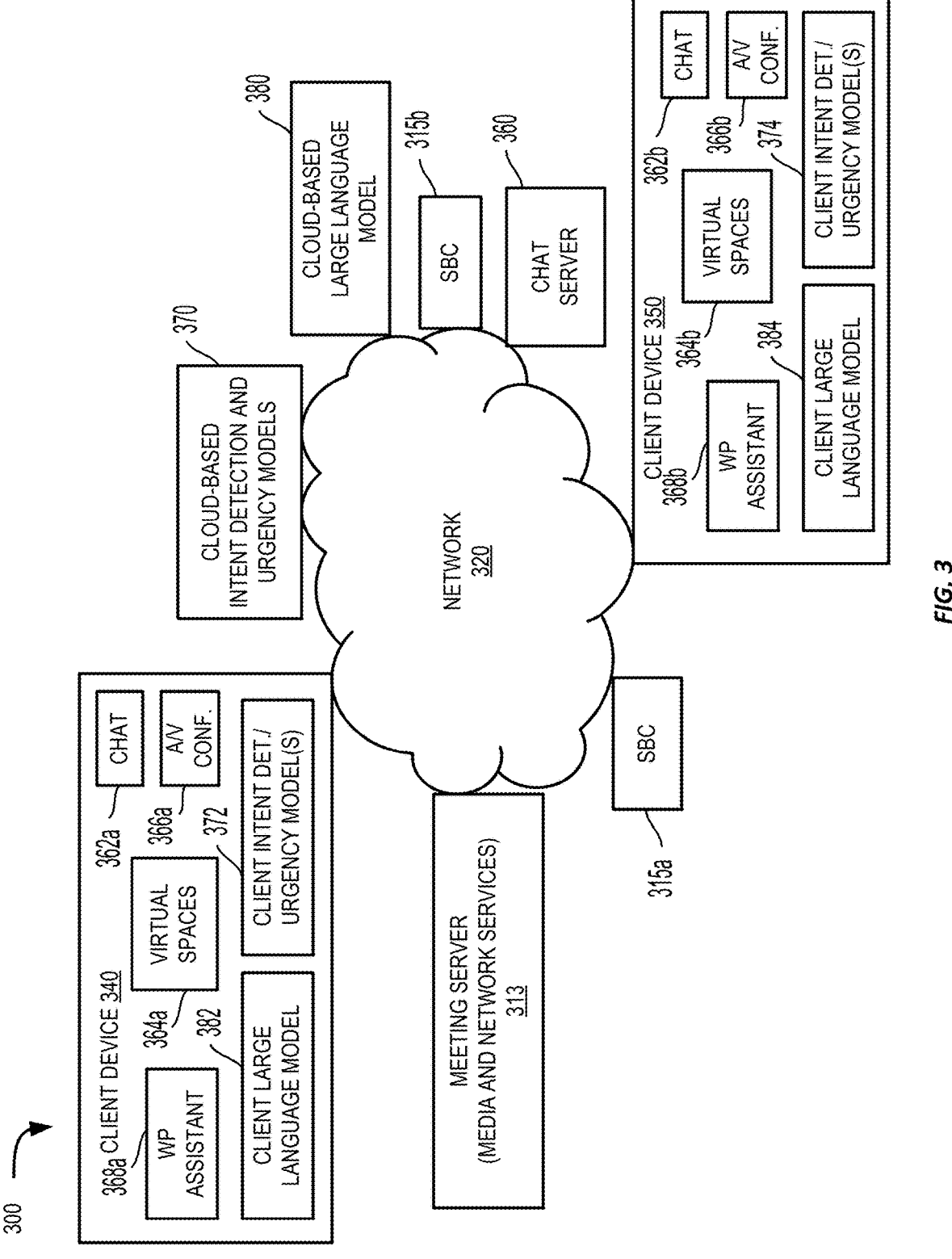

Referring now to FIG. 3, FIG. 3 shows an example integrated communication system 300 in which at least videoconferencing functionality, digital phone functionality, chat functionality and workplace assistant functionality is provided to various client devices, such as client device 340 and client device 350, each communicatively coupled to network 320. System 300 includes the message management capabilities as described herein. System 300 includes meeting server 313. Meeting server 313 may also be referred to as a multimedia router and can be implemented by the real-time media servers 212 working with the network services servers 214. The meeting server maintains stored representations of virtual meetings taking place in the system so that the meeting server can keep track of the status of meetings without constantly exchanging this information with client devices such as client device 340 and client device 350. System 300 includes chat server 360 that provides team chat services. Server 360 stores group definitions, which define chat groups (e.g., chat channels), each with multiple users. The chat dialogs and identities of users participating in the chat groups can be presented to users through graphical interfaces of client applications running on client devices 340 and 350, either through a chat client application or through a workplace assistant client application. Chat groups can also be provided in a Web browser along with other visual interface features to enable users of computing devices without the client application installed to make use of team chat services.

Example system 300 includes session border controllers (SBCs) 315*a-b* for providing digital telephony services. System 300 includes two SBCs as an example. Any number of SBCs can be used; multiple SBCs provide redundancy. The SBCs provide call CODECs (coder/decoder), audio processing, error correction, links to telephone carriers, and encryption for digital telephone calls between client applications to provide digital phone services. The SBCs secure client and carrier communications passing through a data center. The SBCs include load balancers and call switches. As an example, signaling for call setup, management, and teardown in system 300 can be accomplished using session initiation protocol (SIP). SIP communication through the call switches is evenly distributed by the load balancers based on call volume. The call switches provide call control for digital telephone communications and can provide PBX functionality. The call switches also provide integrated functions to enable calls to be transitioned to videoconferences using meeting server 313 and/or vice versa.

In this example, client device 340 and client device 350 each include an instance of a team chat client application, and audio and/or video (A/V) conferencing client application, a virtual spaces client application, and the workplace assistant client application. Client device 340 includes team chat client application 362*a*, virtual spaces client application 364*a*, A/V conferencing application 366*a*, and workplace assistant client application 368*a*. Client device 350 includes team chat client application 362*b*, virtual spaces client application 364*b*, A/V conferencing application 366*b*, and workplace assistant client application 368*b*. Team chat client applications 362*a-b* are communicatively coupled to chat server 360 through network 320. The virtual spaces client applications 364*a-b* leverage data and communication from chat server 360 and meeting server 313 in order to present virtual spaces within the virtual spaces client application. Virtual spaces in this example are maintained on the client device. A/V conferencing client applications can be coupled to meeting server 313 to provide videoconferencing meetings or to the SBCs to provide audioconferencing using digital telephony. Transcripts from A/V conferencing can be accessed to provide additional channels or additional metadata to provide context.

The workplace assistant clients, as an example, may be web applications that run on client devices, each serving as information management application for the user of the client device. The workplace assistant client application provides a user interface through which a user can discover messages in order to determine who is looking for the user and why the user is being sought. Information from multiple sources such as chats, calls, and meetings can be accessed to make these determinations. Documents can be accessed for mentions of a user. The workplaces assistant client application can also provide ways to efficiently deal with others and answer some.

The workplace assistant client application can access information communicated from various channels, for example virtual spaces, electronic whiteboards, email, team chat, digital telephony channels, and meetings. These channels can be communicatively coupled to the workplace assistant client application on the client device, from the cloud, or from one or more servers.

In some cases, connectively between a channel and the workplace assistant client application may be made on the client device because the channel is client-based. For example, the connection between virtual spaces client applications 364*a-b* and respective workplace assistant client applications 368*a-b* may reside on the client device because the virtual spaces client application may be completely client-based, leveraging other servers to access needed data. However, for team chat and meetings, servers 360 and 313 are used, respectively. The workplace assistant client application can access the relevant channels from those servers or on the respective client device. The software modules involved can also access data or information from a particular channel in both ways, switching between the two sources as efficiency dictates given network performance and computational load of the respective client device to provide the best user experience.

Continuing with FIG. 3, system 300 includes cloud-based intent detection and urgency model 370 and cloud-based large language model 380. Either or both of workplace assistant client applications 368*a-b* can be configured to access these models over network 320. The intent detection model selects a category amongst actions, such as an action to share to channel, initiate a google document, change a setting, send a particular type of message, and so on. The urgency model assesses the metadata and context of the received message or the otherwise detected electronic content to label the urgency of the respective input. For example, the urgency model may label the urgency as high, medium and low. The urgency model functions as a classification model service. In this example, the intent detection model and urgency model are deployed in the cloud as a common software module, so that one API call can obtain both kinds of information. However, these functions can be deployed as separate software models, with one predictive, machine-learning model for each of these functions.

Alternatively, or in addition, the workplace assistant client application can use a client-based models. For example, workplace assistant client application 368*a* in FIG. 3 can access client intent detection model/urgency model(s) 372 and client large language model 382, and workplace assistant client application 368*b* can access client intent detection/urgency model(s) 374 and client large language model

384. Cloud-based models can be trained using generic data, while client-based models can be trained with either or both of generic data and client-device based data. In some examples, a client-based model can be trained on a server or in the cloud in part using generic data, deployed to a client device, and then additionally trained using secured user data gathered and stored in association with the workplace assistant client application. As in the cloud-based example, the intent detection model and urgency model can be deployed in the cloud as a common software module or as separate modules.

Figure 4:
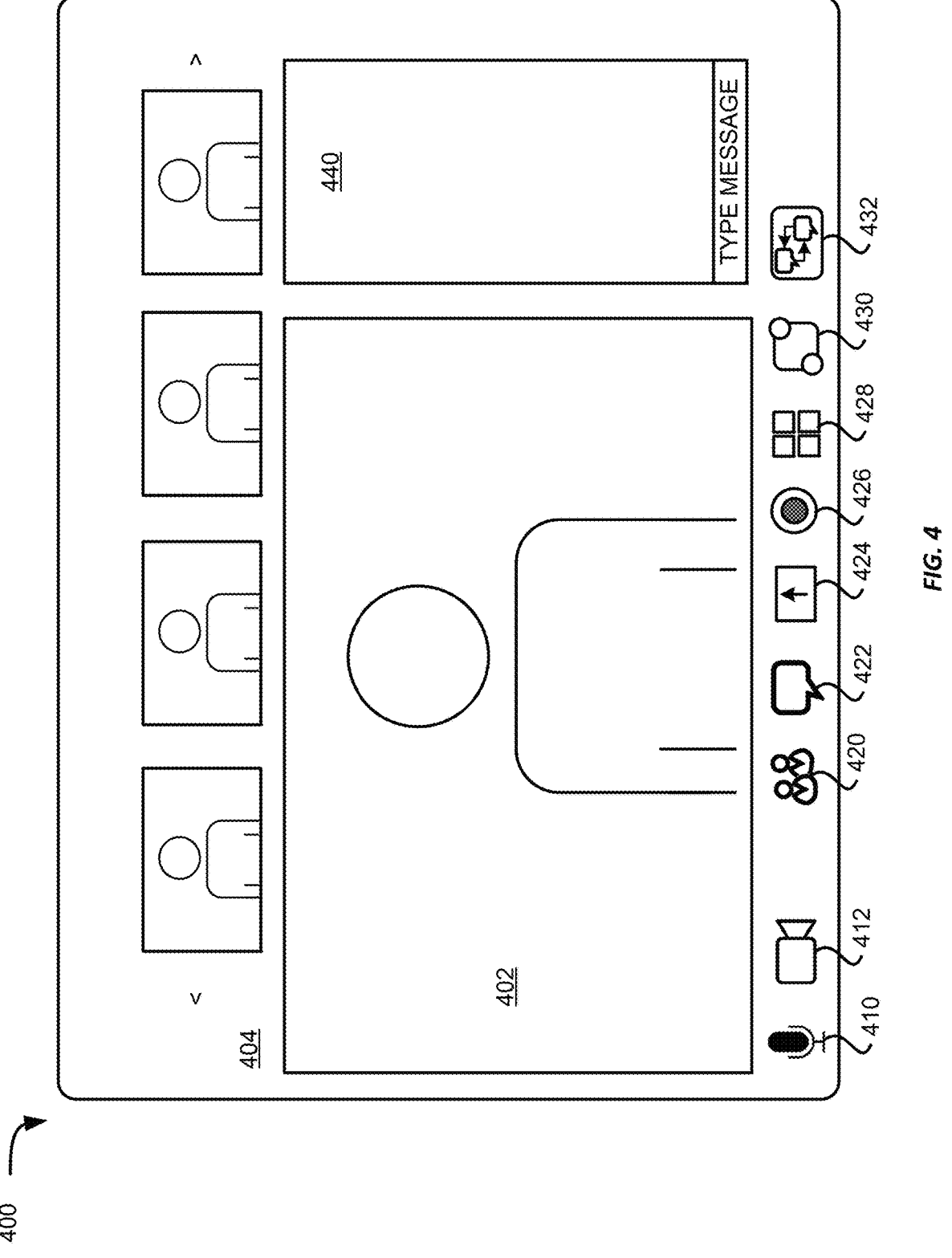

Referring now to FIGS. 4, FIG. 4 illustrates an example GUI 400 for a software client that can interact with a system for managing chat messages. A client device, e.g., client devices 140-180, client devices 220-250, or client devices 340-350, executes a software client as discussed above, which in turn displays the GUI 400 on the client device's display. In this example, the GUI 400 includes a speaker view window 402 that presents the current speaker in the virtual conference. Above the speaker view window 402 are smaller participant windows 404, which allow the participant to view some of the other participants in the virtual conference, as well as controls ("<" and ">") to let the host scroll to view other participants in the virtual conference. On the right side of the GUI 400 is a chat window 440 within which the participants may exchange chat messages. The chat messages exchanged during the conference can be grouped by the virtual conference provider to a meeting specific chat channel. If the virtual conference is a one-time meeting, the chat channel can contain chat messages exchanged by the meeting participants during the virtual conference. The chat channel for a meeting may be created when the conference is scheduled, and participants that are invited to the conference can be granted access to the meeting's channel. The participants can use the chat channel to exchange messages after the meeting has concluded. In some cases, a recurring meeting will have a single dedicated chat channel that is associated with every instance of the recurring meeting.

Beneath the speaker view window 402 are a number of interactive elements 410-430 to allow the participant to interact with the virtual conference software. Controls 410-412 may allow the participant to toggle on or off audio or video streams captured by a microphone or camera connected to the client device. Control 420 allows the participant to view any other participants in the virtual conference with the participant, while control 422 allows the participant to send text messages to other participants, whether to specific participants or to the entire meeting. Control 424 allows the participant to share content from their client device. Control 426 allows the participant to toggle recording of the meeting, and control 428 allows the user to select an option to join a breakout room. Control 430 allows a user to launch an app within the video conferencing software, such as to access content to share with other participants in the virtual conference.

Figure 5:
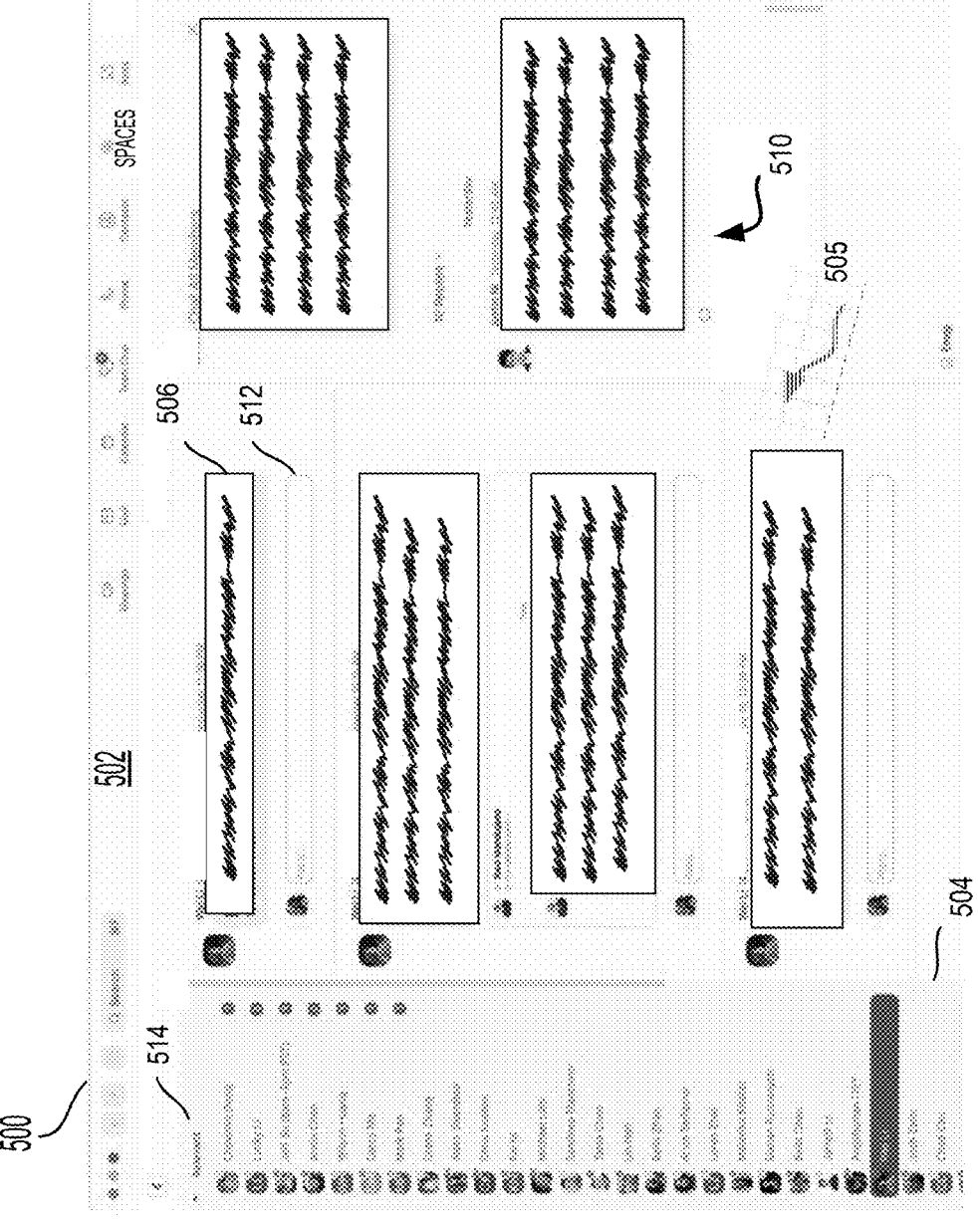
FIGS. 5-6 show example graphical user interfaces ("GUIs") for message management for a virtual conference provider.

Referring now to FIG. 5, FIG. 5 illustrates an example graphical user interface (GUI) 500 that is providing multichannel message management. User interface 500 includes an icon strip 502 for access to various functions, such as meeting, email ("Mail"), calendar, team chat, contacts, phone, virtual spaces ("Spaces") and a digital whiteboard platform ("Whiteboards"). These functions may correspond to sources for determining features used to classify messages (e.g., input features for a classifier model), but sources may include many other data sources or communication paths. GUI 500 also includes a chat channel list 504. This chat channel list can be sorted various ways with the dropdown box at the top. Currently these users are sorted by relevance.

Chat channel list 504 can include chat channels for one or more users or chat channels for one or more topics. Messages in each chat channel can be part of a continuous conversation between the participants subscribed the chat channel. For example, two or more participants may create a chat channel to discuss topics of interests common to the members. In such direct chat channels, preceding messages may provide context for subsequent chat messages as part of a conversation. However, some chat channels in chat channel list 504 can be aggregated chat channels with messages from separate conversations. For example, a user may subscribe to a channel that aggregates messages related to one or more specified topics. In another example, the user may subscribe to a channel that aggregates messages related to one or more specified users. In such aggregated channels, a message may lack context because the message was extracted from the flow of the conversation. For example, an answer may lack context if it is separated from a corresponding question.

Graphical user interface 500 can present messages with their corresponding context. When input to the GUI 500 is used to highlight a chat channel, the snippets of the messages in the chat channel or other content can be displayed in snippet panel 505 immediately adjacent to chat channel list 504. For example, message snippet 506 corresponds to the highlighted chat channel in chat channel list 504. If a snippet such as message snippet 506 is highlighted, the context of that snippet is displayed in context panel 510. The context can identify the source chat channel for message snippet 506 (e.g., the chat channel where the message was posted), the participants subscribed to the source chat channel, and messages from the source chat channel that are related to the message snippet 506. For example, the context 510 can list a specified number of messages before and after the message snippet 506 or messages from the source chat channel that a large language model classified as related to the message snippet 506. In some cases, the message snippet can be an excerpt from a message and context 506 can display the message to provide context. Context 510 may be provided for direct chat channels in some embodiments.

Context panel 510 in GUI 500 in FIG. 5 can display, for chat messages, replies as well as text or electronic content associated with relevant individuals before and after the occurrence of a snippet highlighted in snippet panel 505. This display enables a user to read this material without opening the application in which the material originated.

Continuing with FIG. 5, when a user highlights a message in snippet panel 505, such as snippet 506, the system can detect the received message and access channels coupled to the workplace assistant client application. The message corresponding to snippet 506 is submitted to the predictive models to provide context for the message. The context is based on information from multiple channels, including a lack of information present in the channels. If there is no relevant data in any of the other channels, the workplace assistant client application can be configured so that the models will then use only the received message or only the received message and available metadata. The received message itself is information from one of the channels.

Returning to the chat channel list 504, the chat channels can be presented in an order specified in menu 514. As shown in FIG. 5, the chat channels are shown in a descending order of relevance, however other chat channel orders are possible. For example, the chat channels can be presented in an order based on the timestamp of the most recent message in the channel, based on an urgency score for the chat channel, or an actionability score for the chat channel. The relevance for a particular message can be predicted by a machine learning model. A n-dimensional feature vector (e.g., a vector) can be generated from the metadata for a message or metadata for a chat channel. In this case, n can be the number of features that are input to the model, and each feature can be a characteristic of a message or chat channel (e.g., a value from the metadata). The features, including classifications or membership in groups, can be represented as numerical values.

The feature vector may be generated using information obtained from one or more of the metadata of the particular message, metadata of the chat channel, and metadata of other messages in the chat channel. Each message's metadata can include characteristics about the participant receiving the message and the prediction can be specific to the recipient. For example, information identifying the account number, account age, group membership(s), account language(s), age, gender, education, location, job, and activity for each recipient and sender can be included in a message's metadata.

The machine learning model can be trained to classify vectors representing messages and to classify similar vectors representing messages with unknown classifications. Similar vectors can be vectors that are located near each other in vector space. For a trained model, a feature vector for a message, or chat channel, with an unknown classification can be input to the model, and a probability that the input is relevant can be output by the model. This probability can be a relevancy score for the message.

The urgency score can be based on an urgency specified by the participant sending the message (e.g., red, yellow, or green). In addition, or alternatively, a machine learning model can be used to classify the urgency of the message. For example, the model can use metadata to generate a vector representing the characteristics of a particular message. The model can be trained using the known response time for messages with similar characteristics (e.g., training data with known classifications) to learn to classify the urgency of the particular message. For example, a message with a particular sentiment classification and a URL in the message payload may be classified as urgent because the response time, and response rate, for participants is short. The response time can be the time interval between a message being read and a response being sent, or the time interval between a message being sent and a response being sent. The response rate can be the percentage of recipients that respond to the message. The output from the model can be a predicted response time, and thresholds for the predicted response time can be used to classify the urgency of the message (e.g., red messages have a predicted response time that is less than fifteen minutes, yellow messages have a predicted response time between fifteen minutes and one hour, and green messages have a predicted response time that is greater than one hour).

Similarly, actionability can be determined using one or more machine learning models. A machine learning model can be used to classify a message as probably needing a response (e.g., if a probability output by the model is above a threshold). A vector representing a particular message can be generated from the message's metadata and used as input to the machine learning model. The probability output by the model can be based on the response rate, and response time, for messages that are close to the particular message in vector space. If a response is required, the model, or one or more additional models, can be used to determine a response type for the message. The response type for messages that are close to the particular message in vector space can be used to predict a response for the particular message. The response types can include an emoji response, a short response, a long response, or a task response (e.g., a response that includes creating a ticket or page for Jira, Confluence, Whiteboard, Workday, etc.). In addition, or alternatively, rules-based approaches may be used to classify actionability, relevance, or urgency of a message.

Each channel's predicted score, including relevancy, can be the score for one or more of the most recent messages in the chat channel. For example, the score can be a weighted score for all messages received during a timeframe. Each message can be weighted using any criterion such as weighted by timestamp for the message (e.g., time since the message was sent), the time between subsequent messages, whether the message was read, whether the participant has responded to the message, whether other participants have responded to the message, the type of responses that have been provided to each message, whether the message is on the same topic as preceding messages (e.g., as classified by a natural language processing model), etc. In some embodiments, the predicted score for a chat channel can be directly classified by a machine learning model using the metadata for the chat channel, metadata for one or more messages in the chat channel, or metadata for the chat channel and metadata for one or more messages in the chat channel.

Figure 6:
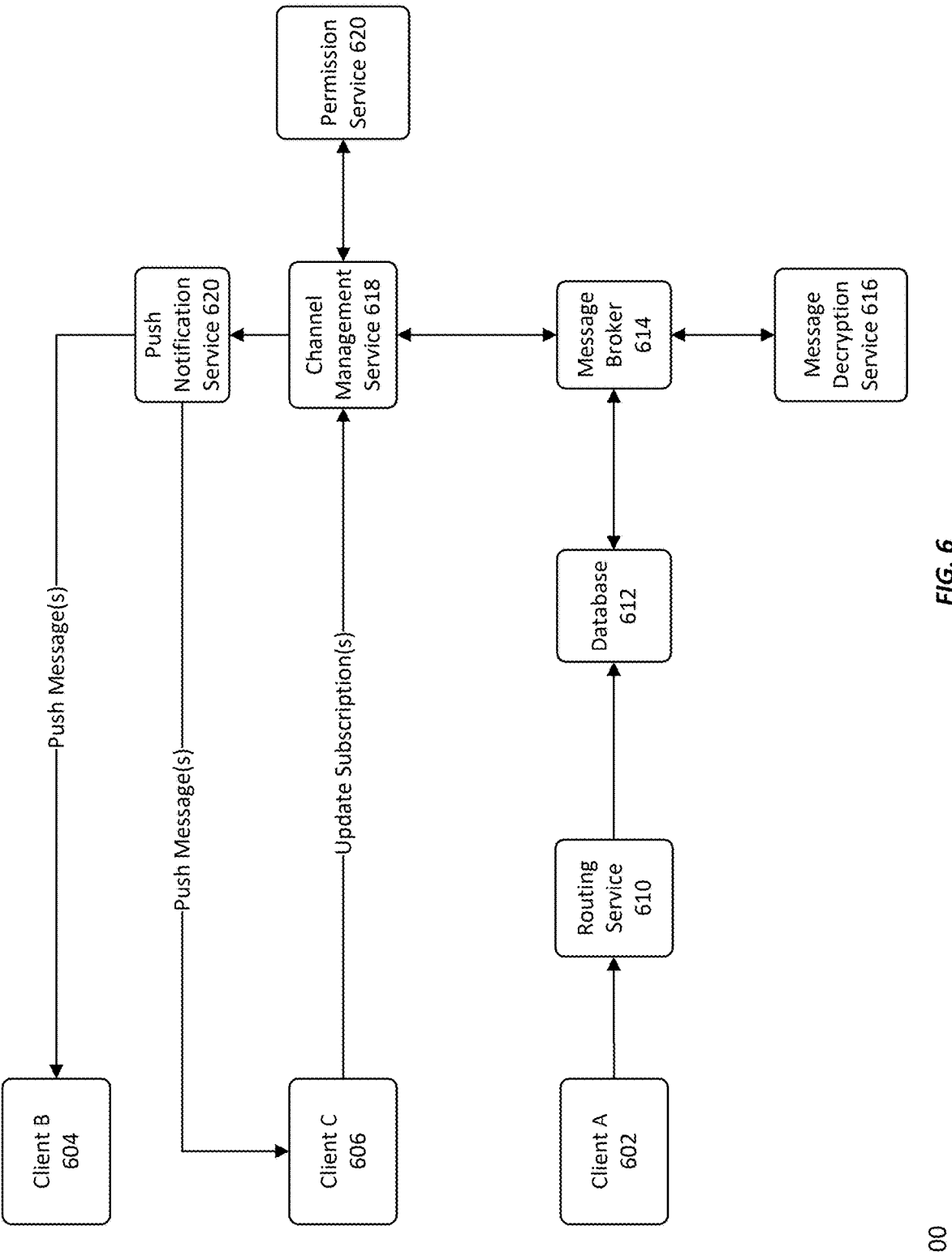

FIG. 6 shows a simplified architecture for routing messages to chat channels according to at least one embodiment. Client A 602, client B 604, and client C 608 can be a client device such as client devices 140-180, client devices 220-250, or client devices 340-350. In some embodiments, every message is sent within a direct chat channel (e.g., sent to one or more recipients identified by the participant sending the message at the time the message was sent) and each message include a unique identifier corresponding to the message's direct channel (e.g., a channel identifier). In addition, each participant account (e.g., user account) can be assigned an account identifier, and the account identifier for the participant sending the message (e.g., the sending account) and the one or more participants receiving the message (e.g., the recipient account) can be included with each message. These identifiers, along with at least a unique message identifier and a timestamp, can be included as metadata that is sent with each message. A direct channel can include a conversation between two participants or a group of participants.

To communicate in a direct chat channel, Client A 602 can send a message with metadata that identifies client B 604. To send this message, Client A 602 provides the message to a routing service 610 along with the message metadata including the identifier for the direct chat channel and an account identifier corresponding to client B 604. The routing service 610 can forward the message to an appropriate database such as database 612 using the metadata. The routing service may use a routing table to identify database 612 from one or more databases of the virtual conference provider. In some embodiments, the routing service 610 may encrypt the message before storing the message in the database 612.

Storing the message in database 612 may trigger message broker 612 to retrieve the message from the database. In some embodiments, the message broker may retrieve new messages at regular intervals or in response to an event. For example, the regular interval can be every 5 minutes, and the event could be a memory utilization threshold for the message broker 614 (e.g., request messages when the memory utilization falls below 80%). The message broker 614 can include a message queue and messages may be requested from the database 612 in response to the number of messages in the queue falling below a threshold. In some embodiments, the database may push messages to the message broker 614.

The message broker 614 may need to decrypt messages before sending them for processing at a channel management service 618. Decryption can be performed by the message decryption service 616. In some embodiments, the messages may remain encrypted until the message reaches a destination client device (e.g., client B 604). The message broker 614 may process multiple messages in parallel, and multiple messages can be sent to the message decryption service 616 simultaneously.

The message broker 614 may push messages to the channel management service 618 as the messages arrive at the broker. The message broker 614 can store messages in a message queue such as an asynchronous message queue. In some embodiments, the message broker 614 can push messages to the channel management service 618 at regular intervals or in response to an event (e.g., a number of messages pending at a message broker queue exceeding a threshold). In some embodiments, the channel management service 618 may request messages from the message broker at regular intervals or in response to an event (e.g., a number of messages pending at a channel management service queue falling below a threshold).

After receiving the message, the channel management service can provide the message to the message to a push notification service 620. To route the message, the push notification service 620 can use one or more of the channel identifier and the account identifier from the message's metadata. The push notification service 620 can send the message without a request from the recipient, client B 604 in this case, and the messages can be forwarded as they are received by the push notification service. However, the messages may be sent by the push notification service 620 at regular intervals in some embodiments.

In addition to sending the message in a direct chat channel, the channel management service 606 may route the same message to one or more aggregated chat channels. An aggregated chat channel can be a chat channel that was created to compile messages that are relevant to one or more topics or one or more users. These compiled messages can be initially sent in a direct chat channel and can be viewed in the corresponding direct chat channel. However, the messages can also be presented to one or more users in an aggregated chat channel as described with reference to FIG. 5. Client C 602 can subscribe to an aggregated chat channel by sending a request to update subscriptions to the channel management service 618, and the request can identify one or more keywords (e.g., topics) and one or more users for the aggregated chat channel. The channel management service 618 can identify messages that are relevant to the one or more identified keywords and one or more identified users (e.g., identify messages with the keywords or messages sent by the users), and these relevant messages can be provided to the aggregated chat channel. Determining relevant messages is described in more detail below. A request to update subscriptions can include creating a new aggregated chat channel, requesting access to an existing aggregated chat channel, modifying an aggregated chat channel (e.g., by adding, changing, or removing keywords or user accounts), or deleting an existing aggregated chat channel.

In an example, client C 606 (e.g., a participant controlling client C) may coordinate travel for a variety of users in an organization. The group of users can include client B 604 (e.g., the participant controlling client B). Instead of waiting for client B 604 to request travel accommodations, client C 606 may subscribe to an aggregated chat channel that compiles messages related to the variety of users' travel. For example, client C 606 may request subscription to an aggregated chat channel by sending a request to update subscriptions to the channel management service 618. The request can identify the keyword "travel" and a list of users including client B 604. These messages can be presented to client C 606 in an aggregated chat channel so that client C 606 has access to the relevant information when client B 604 asks client C to coordinate travel.

The channel management service 606 can use a machine learning model to evaluate the relevance of a message to a particular aggregated chat channel. Relevant messages (e.g., messages with a relevancy score above a threshold) can be added to a corresponding direct chat channel. The model can use features corresponding to the message to assign a relevance score to the message. The message score can be a probability that the message is relevant to a particular aggregated chat channel, and the channel management service 606 may send the message to the aggregated chat channel if the score exceeds a threshold. The features can include metadata such as the account identifiers for the message's creator and recipient, the message's timestamp, the message's payload size, the types of files in the payload, and one or more linguistic characteristics for the payload.

The linguistic characteristics can include features of the payload that are identified using natural language processing or natural language understanding techniques (e.g., a model trained to perform a natural language processing or natural language understanding technique). For example, the linguistic characteristics of a payload can include the number of characters in the payload, the number of words in the payload, semantic labels for words or chunks (e.g., groups of continuous text) in the payload, a sentiment classification for the payload, one or more named entities identified in the payload, part of speech labels for words in the payload, one or more parse trees for text in the payload, one or more discourse trees for text in the payload, and the like. The metadata can also include classifications by one or more language models. More details about natural language processing techniques can be found in: I. Awasthi, K. Gupta, P. S. Bhogal, S. S. Anand and P. K. Soni, "Natural Language Processing (NLP) based Text Summarization-A Survey," 2021 6th International Conference on Inventive Computation Technologies (ICICT), Coimbatore, India, 2021, pp. 1310-1317, doi: 10.1109/ICICT50816.2021.9358703.

The channel management service 618 may use rules to identify messages that are relevant to a particular aggregated chat channel. The rules can be used independently of, or in combination with, one or more machine learning models. For example, rules may be used to filter messages before the messages are provided to a machine learning model. This filtering may reduce the computational demand on the system by reducing the number of messages that are fed to a machine learning model (e.g., because the filtering may exclude a subset of the messages). The rules can be part of a weighted formula that is used to calculate a relevance score for each message, and messages may be forwarded to a model, or added to the channel, if the relevancy score is above a threshold. The rules may include rules for any of the features identified above with reference to the machine learning model. The machine learning models used by the channel management service can be external to the channel management service and the service may provide metadata for the message as input to the models and receive classifications as output from the models.

In addition to routing messages to direct chat channels, the channel management service 618 can use message classifications to rank the relevance of chat channels. This ranking can include both direct chat channels and indirect chat channels, and messages may be ranked by other criteria including actionability or urgency as described with reference to FIG. 5. A score for each channel can be used to rank the channels, and a model can assign a score to each channel using any combination of the metadata corresponding to the channel (e.g., metadata for the channel and messages sent in the channel). In addition, or alternatively, the score for a chat channel can be the probability output for one or more of the messages in the chat channel. For example, the score can be based on the last message sent in the chat channel or a weighted combination of some or all of the messages in the chat channel.

To provide this functionality, any suitable machine learning model may be used. Examples of suitable machine learning models include deep learning models, neural networks (e.g., deep learning neural networks), kernel-based regressions, adaptive basis regression or classification, Bayesian methods, ensemble methods, logistic regression and extensions, Gaussian processes, support vector machines (SVMs), a probabilistic model, and a probabilistic graphical model. Embodiments using neural networks can employ using wide and tensorized deep architectures, convolutional layers, dropout, various neural activations, and regularization steps.

FIG. 7 shows an example machine learning model of a neural network. As an example, the chat service can classify the relevance, actionability, or urgency of chat messages using a neural network that comprises a number of neurons (e.g., neuron 702; Adaptive basis functions) organized in layers (e.g., layer 704). The training of the neural network can iteratively search for the best configuration of the parameters of the neural network for feature recognition and classification performance. Various numbers of layers and nodes may be used. A person with skills in the art can easily recognize variations in a neural network design and design of other machine learning models.

After it is trained, the machine learning model can make use of chat channel metadata and message metadata to provide relevancy information as discussed above. The metadata may include information that is retrieved from the virtual conference provider using the information included in the message. The metadata may identify a user account that sent the message (e.g., the sender) and a user account that received the message (e.g., the recipient). The metadata can include a last timestamp for a meeting between the sender and a recipient, the number of one-on-one meetings between the sender and the recipient, the number of shared group meetings between the sender and the recipient, the proximity of a message to a meeting between he sender and recipient (e.g., messages before or after a meeting may be relevant), the number of active chat days between the sender and the recipient (e.g., consecutive days where a message has been sent, in either direction, between the sender and the recipient), the number of direct chat channel messages between the sender and the recipient, the number of times that either of the recipient or sender mentions the other party in a message, whether the sender or the recipient is in the other parties favorites list, whether a chat channel that includes both parties is in either parties favorites list, whether the two parties have common access to a shared folder in the virtual conference provider's system, the number of shared user groups that include both parties, relationship information from an organizational chart (e.g., is one party a manager of the other party; are both parties in the same department), a number of voice calls made through the virtual conference provider or by a client device, a number of missed calls for either party, a number of text messages sent between the parties using a client device (e.g., smartphone), etc.

Referring now to FIG. 8, FIG. 8 shows an example method 800 for message management for a virtual conference. This example method 800 will be described with respect to the systems 100-400 shown in FIGS. 1-4, the example GUIs 500-600 shown in FIGS. 5-6, and the example machine learning model 700 shown in FIG. 7; however, any suitable systems or GUIs according to this disclosure may be employed.

At block 810, a message in a database of a virtual conference service can be accessed. The message can be accessed by a channel management service of the virtual conference service (e.g., video conferencing service or virtual conferencing service). The message may be a message that was sent in a direct chat channel. A direct chat channel can be a communication pathway between two or more participants (e.g., users or user accounts). The message may be accessed when the message is sent, when the message is received, or the message may be accessed at any time after it was created. The message may be accessed from a database of the virtual conferencing service (e.g., database 612). The message may need to be decrypted to be accessed, and the channel management service may check permissions before accessing the message. In some embodiments, the message may be marked private and the permissions for the message may prevent parties from outside the direct chat channel in which the message was sent from accessing the message. Other permissions are contemplated, and the permissions can include any number of a whitelist for user accounts that can access the message, a blacklist for accounts that are prevented from accessing the messages, and organization-based permissions (e.g., access limited to an organization or a subunit of an organization). The channel management service can be channel management service 618, however, some or all of the functionalities described with reference to the channel management service may be performed by other components described herein (e.g., message broker 614).

At block 820, one or more features of the message can be identified. These features can be identified by the channel management service of the virtual conference service. The features can include any of the metadata described herein. The features can be used to create input to a machine learning model, and, for example, the input can be an n-dimensional feature vector. In some embodiments, the input can be provided to one or more machine learning models and a score can be received as output. The one or more machine learning models can be trained to output information indicating that the message corresponding to the input is actionable, urgent, or relevant. The output score can be a probability, and the output can be compared to one or more thresholds to classify the message. In some cases, the features can be compared to one or more rules that can be used to determine the actionability, the urgency, or the relevance of the message.

At block 830, one or more features of a particular chat channel can be identified. These features can be identified by the channel management service of the virtual conference service. The one or more features can be identified for each chat channel of a plurality of chat channels, and the particular chat channel can be one of the plurality of chat channels. These features can be identified by the channel management service of the virtual conference service. The features can include any of the metadata described herein. The features can be used to create input to a machine learning model, and, for example, the input can be an n-dimensional feature vector. In some embodiments, the input can be provided to one or more machine learning models and a score can be received as output. The one or more machine learning models can be trained to output information indicating that the channel corresponding to the input is actionable, urgent, or relevant. The output score can be a probability, and the output can be compared to one or more thresholds to classify the channel. In some cases, the features can be compared to one or more rules that can be used to determine the actionability, the urgency, or the relevance of the channel. The channel can be an aggregated chat channel, and the features can include one or more keywords, one or more user accounts, or a combination of user accounts and keywords.

At block 840, whether to classify the message as belonging to the particular chat channel can be determined. The classification can be determined by the channel management service of the virtual conference service, and the classification can be determined using the features of the particular chat channel and the features of the message. In some embodiments, only the features of the particular chat channel or only the features of the message may be used to determine a classification for the message. The classification can be a score or probability that the message is relevant to a particular chat channel or a particular participant (e.g., user, user account). The classification can identify the actionability of the message, or the urgency of the message. The particular chat channel can be an aggregated chat channel and the message may have previously been sent in a direct chat channel. An aggregated chat channel may only be associated with a single user in some embodiments, or an aggregated chat channel may be associated with multiple user accounts.

At block 850, a channel score can be assigned to each of the plurality of chat channels. The channel score can be assigned by the channel management service of the virtual conference service, and the score can be based on the classification of the message. The channel score can be a score of the most recent message classified as belonging to the channel, the most recent message sent in the chat channel, a weighted average of some or all of the messages sent in the chat channel, an average of some or all of the messages sent in the chat channel, etc. For example, the messages can be weighted by a value corresponding to the sender or a value corresponding to the time since the message was sent.

At block 860, an order for the plurality of chat channels can be determined. The order can be determined by the channel management service of the virtual conference provider, and the order can be determined based on the channel score for each of the plurality of chat channels. In some embodiments, the order may be determined for only a subset of the chat channels.

At block 870, the plurality of chat channels can be presented in order. The chat channels may be presented by a graphical user interface of the virtual conference service. For example, the graphical user interface may be presented on a display of a client device executing client software for the virtual conference service.

Although FIG. 8 shows example blocks of process 800, in some implementations, method 800 may include additional blocks, fewer blocks, different blocks, or differently arranged blocks than those depicted in FIG. 8. Additionally, or alternatively, two or more of the blocks of method 800 may be performed in parallel. Method 800 can be implemented as a device, system, or non-transitory computer readable medium storing instructions configured to perform any of the operations disclosed with reference to process 800.

Figure 9:
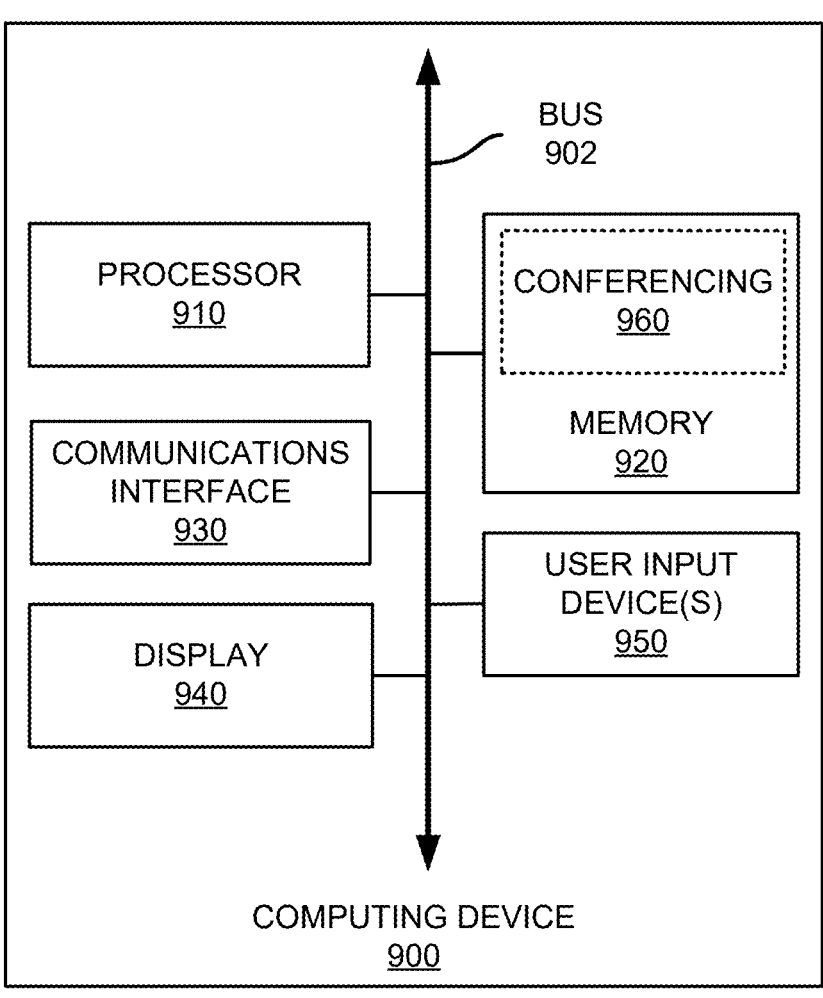
FIG. 9 shows an example computing device suitable for use with example systems and methods for message management for a virtual conference provider.

Referring now to FIG. 9, FIG. 9 shows an example computing device 900 suitable for use in example systems or methods for automated video editing for a virtual conference according to this disclosure. The example computing device 900 includes a processor 910 which is in communication with the memory 920 and other components of the computing device 900 using one or more communications buses 902. The processor 910 is configured to execute processor-executable instructions stored in the memory 920 to perform one or more methods for automated video editing for a virtual conference according to different examples, such as part or all of the example method 700 described above with respect to FIGS. 7. The computing device 900, in this example, also includes one or more user input devices 950, such as a keyboard, mouse, touchscreen, microphone, etc., to accept user input. The computing device 900 also includes a display 940 to provide visual output to a user.

In addition, the computing device 900 includes a video conferencing application 960 to enable a user to join and participate in one or more virtual spaces or in one or more conferences, such as a conventional conference or webinar, by receiving media streams from a virtual conference provider, sending media streams to the virtual conference provider, joining and leaving breakout rooms, creating virtual conference expos, etc., such as described throughout this disclosure, etc.

The computing device 900 also includes a communications interface 930. In some examples, the communications interface 930 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

What is claimed is:

1. A method for managing messages within a virtual conference service comprising:

accessing, by a channel management service of the virtual conference service, a message in a database of the virtual conference service;

identifying, by the channel management service of the virtual conference service, one or more features of the message, wherein the one or more features of the message comprise a keyword and first information about a first user account associated with the message; and for each chat channel of a plurality of chat channels:

identifying, by the channel management service of the virtual conference service, one or more features of a particular chat channel, wherein the one or more features of the particular chat channel comprise a second keyword and second information about a second user account associated with the particular chat channel; and determining, by the channel management service of the virtual conference service, whether to classify the message as belonging to the particular chat channel based on the one or more features of the message and the one or more features of the particular chat channel;

assigning, by the channel management service of the virtual conference service, a channel score to each of the plurality of chat channels based on the classification;

determining, by the channel management service of the virtual conference service, an order for the plurality of chat channels, wherein the order is determined based on the channel score for each of the plurality of chat channels; and presenting, via a graphical user interface of the virtual conference service, the plurality of chat channels in the order.

2. The method of claim 1, wherein classifying the message comprises:

for each chat channel:

providing, by the channel management service of the virtual conference service, the one or more identified features of the message and one or more features of the particular chat channel as input to a machine learning model;

receiving, by the channel management service of the virtual conference service, a message score as output from the machine learning model;

comparing, by the channel management service of the virtual conference service, the message score to a message threshold; and classifying, by the channel management service of the virtual conference service, the message as belonging to the particular chat channel based on the message score exceeding the message threshold.

3. The method of claim 1, wherein classifying the message comprises: for each chat channel:

accessing, by the channel management service of the virtual conference service, a set of rules corresponding to the particular chat channel;

comparing, by the channel management service of the virtual conference service, the one or more features of the message and the one or more features of the particular chat channel to set of rules; and classifying, by the channel management service of the virtual conference service, the message as belonging to the particular chat channel based on the comparing.

4. The method of claim 1, wherein the plurality of chat channels comprise one or more aggregated chat channels, wherein an aggregated chat channel includes at least one message that was initially sent in a direct chat channel.

5. The method of claim 4, wherein the direct chat channel comprises a sequential list of messages that were sent in the direct chat channel.

6. The method of claim 4, wherein a message sent in the direct chat channel is addressed to one or more user accounts associated with the direct chat channel.

7. The method of claim 4, wherein the direct chat channel is associated with at least two user accounts and the aggregated chat channel is associated with a single user account.

8. A computing device, comprising:

one or more memories; and one or more processors in communication with the one or more memories and configured to execute instructions stored in the one or more memories to perform operations comprising:

accessing a message in a database of a virtual conference service;

identifying one or more features of the message, wherein the one or more features of the message comprise a keyword and first information about a first user account associated with the message;

for each chat channel of a plurality of chat channels:

identifying one or more features of a particular chat channel, wherein the one or more features of the particular chat channel comprise a second keyword and second information about a second user account associated with the particular chat channel; and classifying the message as belonging to the plurality of chat channels based on the one or more features of the message and the one or more features of the particular chat channel;

assigning a channel score to each of the plurality of chat channels based on the classification;

determining an order for the plurality of chat channels, wherein the order is determined based on the channel score for each of the plurality of chat channels; and presenting the plurality of chat channels in the order.

9. The device of claim 8, wherein classifying the message comprises:

for each chat channel:

providing the one or more identified features of the message and one or more features of the particular chat channel as input to a machine learning model;

receiving a message score as output from the machine learning model;

comparing the message score to a message threshold; and classifying the message as belonging to the particular chat channel based on the message score exceeding the message threshold.

10. The device of claim 8, wherein classifying the message comprises: for each chat channel:

accessing a set of rules corresponding to the particular chat channel;

comparing the one or more features of the message and the one or more features of the particular chat channel to set of rules; and classifying the message as belonging to the particular chat channel based on the comparing.

11. The device of claim 8, wherein the plurality of chat channels comprise one or more aggregated chat channels, wherein an aggregated chat channel includes at least one message that was initially sent in a direct chat channel.

12. The device of claim 11, wherein the direct chat channel comprises a sequential list of messages that were sent in the direct chat channel.

13. The device of claim 11, wherein a message sent in the direct chat channel is addressed to one or more user accounts associated with the direct chat channel.

14. The device of claim 11, wherein the direct chat channel is associated with at least two user accounts and the aggregated chat channel is associated with a single user account.

15. A non-transitory computer-readable medium storing a plurality of instructions that, when executed by one or more processors of a computing device, cause the one or more processors to perform operations comprising:

accessing a message in a database of a virtual conference service;

identifying one or more features of the message, wherein the one or more features of the message comprise a keyword and first information about a first user account associated with the message;

for each chat channel of a plurality of chat channels:

identifying one or more features of a particular chat channel, wherein the one or more features of the particular chat channel comprise a second keyword and second information about a second user account associated with the particular chat channel; and classifying the message as belonging to the plurality of chat channels of the first user account or the second user account based on the one or more features of the message and the one or more features of the particular chat channel;

assigning a channel score to each of the plurality of chat channels based on the classification;

determining an order for the plurality of chat channels, wherein the order is determined based on the channel score for each of the plurality of chat channels; and presenting the plurality of chat channels in the order.

16. The medium of claim 15, wherein classifying the message comprises: for each chat channel:

providing the one or more identified features of the message and one or more features of the particular chat channel as input to a machine learning model;

receiving a message score as output from the machine learning model;

comparing the message score to a message threshold; and classifying the message as belonging to the particular chat channel based on the message score exceeding the message threshold.

17. The medium of claim 15, wherein classifying the message comprises: for each chat channel:

accessing a set of rules corresponding to the particular chat channel;

comparing the one or more features of the message and the one or more features of the particular chat channel to set of rules; and classifying the message as belonging to the particular chat channel based on the comparing.

18. The medium of claim 15, wherein the plurality of chat channels comprise one or more aggregated chat channels, wherein an aggregated chat channel includes at least one message that was initially sent in a direct chat channel.

19. The medium of claim 18, wherein the direct chat channel comprises a sequential list of messages that were sent in the direct chat channel.

20. The medium of claim 18, wherein a message sent in the direct chat channel is addressed to one or more user accounts associated with the direct chat channel.

* * * * *